(12) United States Patent
Mukasa

(10) Patent No.: US 11,506,837 B2
(45) Date of Patent: Nov. 22, 2022

(54) OPTICAL FIBER AND METHOD FOR MANUFACTURING OPTICAL FIBER

(71) Applicant: FURUKAWA ELECTRIC CO., LTD., Tokyo (JP)

(72) Inventor: Kazunori Mukasa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/342,599

(22) Filed: Jun. 9, 2021

(65) Prior Publication Data

US 2021/0294030 A1 Sep. 23, 2021

Related U.S. Application Data

(63) Continuation of application No. PCT/JP2019/047464, filed on Dec. 4, 2019.

(30) Foreign Application Priority Data

Dec. 12, 2018 (JP) .............................. JP2018-232499

(51) Int. Cl.
*C03B 37/014* (2006.01)
*G02B 6/02* (2006.01)
*G02B 6/036* (2006.01)

(52) U.S. Cl.
CPC .......... *G02B 6/0365* (2013.01); *C03B 37/014* (2013.01); *G02B 6/02214* (2013.01);
(Continued)

(58) Field of Classification Search
CPC .............. C03B 37/014; C03B 2201/12; C03B 2201/31; C03B 2203/22; G02B 6/02004; G02B 6/02214; G02B 6/0365
See application file for complete search history.

(56) References Cited

U.S. PATENT DOCUMENTS 7,187,833 B2 * 3/2007 Mishra ............... G02B 6/02242
385/127
7,440,663 B2 10/2008 Matuso et al.
(Continued)

FOREIGN PATENT DOCUMENTS

CN 104316994 A 1/2015
JP 2008-139887 A 6/2008
(Continued)

OTHER PUBLICATIONS

International Search Report dated Feb. 4, 2020 in PCT/JP2019/047464 filed on Dec. 4, 2019, 2 pages.
(Continued)

*Primary Examiner* — Ryan A Lepisto
(74) *Attorney, Agent, or Firm* — Oblon, McClelland, Maier & Neustadt, L.L.P.

(57) ABSTRACT

An optical fiber includes: a central core portion; an intermediate layer formed around an outer circumference of the central core portion; a trench layer formed around an outer circumference of the intermediate layer; and a cladding portion formed around an outer circumference of the trench layer. Further, when, relative to the cladding portion, a relative refractive-index difference of the central core portion is $\Delta 1$, a relative refractive-index difference of the intermediate layer is $\Delta 2$, and a relative refractive-index difference of the trench layer is $\Delta 3$, relationships $\Delta 1 > \Delta 2 > \Delta 3$ and $0 > \Delta 3$ are satisfied and $\Delta 1$ is equal to or greater than 0.34% and equal to or less than 0.40%, $|\Delta 3|$ is equal to or less than 0.25%, and $\Delta 1 \times |\Delta 3|$ is less than 0.08%².

11 Claims, 2 Drawing Sheets

(52) U.S. Cl.
CPC ...... *C03B 2201/12* (2013.01); *C03B 2201/31* (2013.01); *C03B 2203/22* (2013.01); *G02B 6/02004* (2013.01)

(56) References Cited

U.S. PATENT DOCUMENTS

| | | | |
|---|---|---|---|
| 7,555,186 | B2 | 6/2009 | Flammer et al. |
| 7,894,698 | B2 | 2/2011 | Flammer et al. |
| 8,200,057 | B2 * | 6/2012 | Han .................... G02B 6/0283 385/127 |
| 8,385,701 | B2 * | 2/2013 | Bookbinder ....... G02B 6/03683 385/124 |
| 8,724,954 | B2 * | 5/2014 | Konishi ............. G02B 6/03638 385/128 |
| 8,837,891 | B2 * | 9/2014 | Oyamada ............. G02B 6/0283 385/124 |
| 9,995,873 | B2 * | 6/2018 | Bickham ................ G02B 6/428 |
| 2005/0244120 | A1 | 11/2005 | Mishra et al. |
| 2013/0136405 | A1 | 5/2013 | Bookbinder et al. |
| 2013/0136406 | A1 | 5/2013 | Bookbinder et al. |
| 2013/0136407 | A1 | 5/2013 | Berkey et al. |
| 2013/0272669 | A1 * | 10/2013 | Oyamada ........... G02B 6/03644 385/126 |
| 2017/0269294 | A1 | 9/2017 | Endo et al. |
| 2018/0031761 | A1 | 2/2018 | Bookbinder et al. |

FOREIGN PATENT DOCUMENTS

| | | |
|---|---|---|
| JP | 2010-181641 A | 8/2010 |
| JP | 4833071 B2 | 12/2011 |
| JP | 2012-212115 A | 11/2012 |
| JP | 2013-235261 A | 11/2013 |
| JP | 2013-242545 A | 12/2013 |
| JP | 2015-503122 A | 1/2015 |
| JP | 2017-026698 A | 2/2017 |
| WO | 2010/093187 A2 | 8/2010 |

OTHER PUBLICATIONS

Extended European Search Report dated Jul. 19, 2022, in corresponding European patent Application No. 19897402.4, 7 pages.

* cited by examiner

OPTICAL FIBER AND METHOD FOR MANUFACTURING OPTICAL FIBER

CROSS-REFERENCE TO RELATED APPLICATION(S)

This application is a continuation of International Application No. PCT/JP2019/047464, filed on Dec. 4, 2019 which claims the benefit of priority of the prior Japanese Patent Application No. 2018-232499, filed on Dec. 12, 2018, the entire contents of which are incorporated herein by reference.

BACKGROUND

The present disclosure relates to an optical fiber and a method for manufacturing the optical fiber.

BACKGROUND

Optical fibers with three-layer structures including trench structures have conventionally been disclosed in order to achieve single-mode optical fibers having low bending loss characteristics specified by, for example, ITU-T (the International Telecommunication Union's Telecommunication Standardization Sector) G.657.A2 (Patent Literatures 1 to 6). An optical fiber with a three-layer structure includes, for example, a central core portion, an intermediate layer formed around the outer circumference of the central core portion, a trench layer formed around the outer circumference of the intermediate layer, and a cladding portion formed around the outer circumference of the trench layer.

Optical characteristics of such an optical fiber with a three-layer structure are designed by setting structural parameters, such as a relative refractive-index difference $\Delta 1$ of the central core portion, a relative refractive-index difference $\Delta 2$ of the intermediate layer, a relative refractive-index difference $\Delta 3$ of the trench layer, a core diameter 2a of the central core portion, an inner diameter 2b of the trench layer (in other words, the outer diameter of the intermediate layer), and an outer diameter 2c of the trench layer. Usually, $\Delta 3$ is a negative number and $\Delta 2$ is a number smaller than $\Delta 1$. Japanese Patent No. 4833071 and Japanese Laid-open Patent Publication Nos. 2008-139887, 2010-181641, 2012-212115, 2013-242545, and 2013-235261 have also disclosed various combinations of values of these structural parameters.

The disclosed optical fibers, however, have room for improvement in terms of manufacturability. For example, if $\Delta 1$ is designed to be high, the amount of use of a dopant to enhance the refractive index during manufacture is increased. Likewise, if the absolute value of $\Delta 3$ is designed to be high, the amount of use of a dopant to lower the refractive index during manufacture is increased. Meanwhile, if $\Delta 1$ in particular is designed to be too low, the amount of use of the dopant has to be controlled accurately, and the optical fibers are susceptible to disturbances, which may lead to a large error in manufacturing.

SUMMARY

There is a need for providing an optical fiber having low bending loss characteristics as well as high manufacturability, and a method for manufacturing the optical fiber.

According to an embodiment, an optical fiber incudes: a central core portion; an intermediate layer formed around an outer circumference of the central core portion; a trench layer formed around an outer circumference of the intermediate layer; and a cladding portion formed around an outer circumference of the trench layer. Further, when, relative to the cladding portion, a relative refractive-index difference of the central core portion is $\Delta 1$, a relative refractive-index difference of the intermediate layer is $\Delta 2$, and a relative refractive-index difference of the trench layer is $\Delta 3$, relationships $\Delta 1 > \Delta 2 > \Delta 3$ and $0 > \Delta 3$ are satisfied and $\Delta 1$ is equal to or greater than 0.34% and equal to or less than 0.40%, $|\Delta 3|$ is equal to or less than 0.25%, and $\Delta 1 \times |\Delta 3|$ is less than $0.08\%^2$.

DETAILED DESCRIPTION

Figure 1:
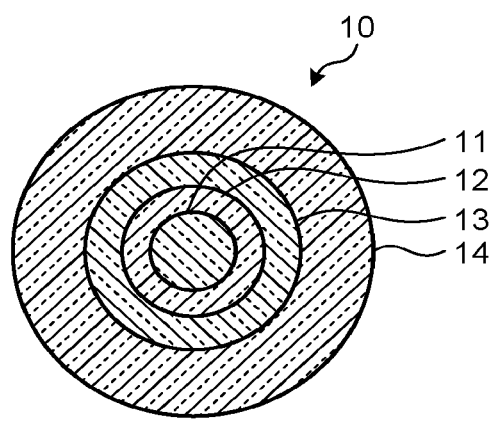
FIG. 1 is a schematic cross-sectional diagram of an optical fiber according to a first embodiment.

An embodiment of the present disclosure will be described in detail below with reference to the drawings. The embodiment to be described below does not limit the present disclosure. In the drawings, the same reference sign is given to the same or corresponding components as appropriate, and the description thereof is omitted as appropriate. In the present specification, a cutoff wavelength refers to an effective cutoff wavelength and means the cable cutoff wavelength defined in the International Telecommunication Union's Telecommunication Standardization Sector (ITU-T) G.650.1. Other terms that are not defined in particular in the present specification are to be pursuant to the definitions and measurement methods in G.650.1 and G.650.2.

First Embodiment

FIG. 1 is a schematic cross-sectional diagram of an optical fiber according to a first embodiment. An optical fiber 10 is made of silica glass, and includes a central core portion 11, an intermediate layer 12 formed around the outer circumference of the central core portion 11, a trench layer 13 formed around the outer circumference of the intermediate layer 12, and a cladding portion 14 formed around the outer circumference of the trench layer 13.

Figure 2:
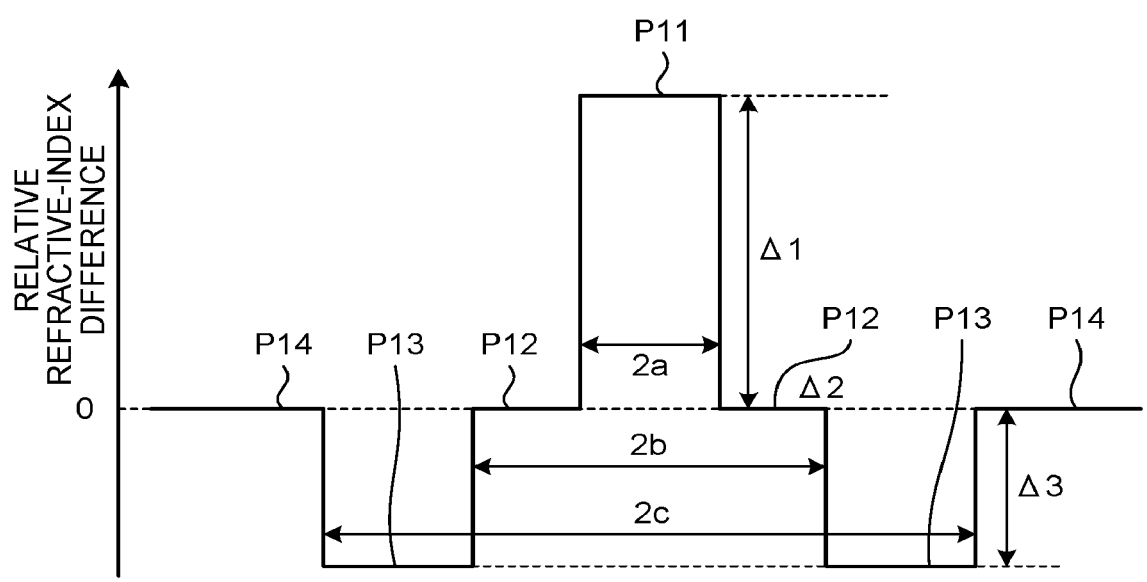
FIG. 2 is a diagram illustrating refractive index profiles of the optical fiber illustrated in FIG. 1.

FIG. 2 is a diagram illustrating refractive index profiles of the optical fiber 10. A profile P11 is the refractive index profile of the central core portion 11 and is of what is called step-index type. A profile P12 is the refractive index profile of the intermediate layer 12. A profile P13 is the refractive index profile of the trench layer 13. A profile P14 is the refractive index profile of the cladding portion 14.

Structural parameters for the optical fiber 10 will be described next. First, the core diameter of the central core portion 11 is 2a. The outer diameter of the intermediate layer 12, in other words, the inner diameter of the trench layer 13, is 2b, and the outer diameter of the trench layer 13 is 2c. Consequently, the width (the trench width) of the trench layer 13 is (c−b). The relative refractive-index difference of the maximum refractive index of the central core portion 11 from the refractive index of the cladding portion 14 is $\Delta 1$. The relative refractive-index difference of the refractive index of the intermediate layer 12 from the refractive index of the cladding portion 14 is Δ2. The relative refractive-index difference of the refractive index of the trench layer 13 from the refractive index of the cladding portion 14 is Δ3. For Δ1, Δ2, and Δ3, the relationships of Δ1>Δ2>Δ3 and 0>Δ3 hold. In other words, Δ3 is a negative value, whereby the trench layer 13 improves low bending loss characteristics of the optical fiber 10.

Constituent materials of the optical fiber 10 will now be exemplarily illustrated. The central core portion 11 is made of silica glass with which a dopant, such as germanium (Ge), for adjusting the refractive index to enhance the refractive index is doped. The trench layer 13 is made of silica glass with which a dopant, such as fluorine (F), to lower the refractive index is doped. The cladding portion 14 is made of pure silica glass that does not include a dopant, such as Ge and F, for adjusting the refractive index. The intermediate layer 12 may be made of pure silica glass, or may be doped with a certain amount of dopant for adjusting the refractive index. However, constituent materials and dopants are not particularly limited as long as the inequalities described above regarding Δ1, Δ2, and Δ3 hold.

For Δ1 and Δ3 in the optical fiber 10, Δ1 is equal to or greater than 0.34% and less than 0.40%, |Δ3|, which is an absolute value of Δ3 is equal to or less than 0.25%, and Δ1×|Δ3| is less than 0.08%$^2$. In this manner, Δ1 being equal to or greater than 0.34% and less than 0.40% can reduce the amount of use of the dopant to enhance the refractive index during manufacture and also facilitate control of the amount of use of the dopant, and makes the optical fiber relatively less susceptible to disturbances, which can reduce an error in manufacturing. Additionally, |Δ3| being equal to or less than 0.25% can reduce the amount of use of the dopant to lower the refractive index. Furthermore, Δ1×|Δ3| being less than 0.08%$^2$ can successfully enhance the effect of reducing the amount of use of the dopants, the effect of the ease of control, and the effect of reducing the error in manufacturing, so that the optical fiber 10 has high manufacturability.

If |Δ3| is less than 0.25%, what is more, equal to or less than 0.20%, and preferably equal to or less than 0.18%, the amount of use of the dopants can further be reduced. If |Δ3| is equal to or greater than 0.10%, control of the amount of use of the dopants is easy and the error in manufacturing can be reduced. As a result, the optical fiber 10 has even higher manufacturability. In a case in which |Δ3| is equal to or greater than 0.10%, Δ1×|Δ3| is equal to or greater than 0.034%$^2$. Consequently, Δ1×|Δ3| is preferably equal to or greater than 0.034%$^2$.

Preferable ranges of the other structural parameters will now be exemplarily illustrated. The value of Δ2 is, for example, equal to or greater than −0.05% and equal to or less than 0.05%. The value of b/a is, for example, equal to or greater than 1.8, c/a is, for example, equal to or greater than 3.4 and equal to or less than 5.0, and preferably equal to or greater than 3.4 and equal to or less than 4.6. The width (c−b) of the trench layer 13 is, for example, equal to or greater than 7 μm, and preferably equal to or greater than 8 μm. The value of 2a is set in such a manner that the effective cutoff wavelength of the optical fiber 10 is equal to or less than 1260 nm.

By combining values of these structural parameters as appropriate, the mode field diameter (MFD) at a wavelength of 1310 nm of the optical fiber 10 can be set to be equal to or greater than 8.6 μm and equal to or less than 9.5 μm. Additionally, the bending loss at a wavelength of 1550 nm in a case in which the optical fiber 10 is bent at a diameter of 20 mm (hereinafter, the bending loss at a wavelength of 1550 nm in a case in which the optical fiber 10 is bent at a diameter of 20 mm may be referred simply to as a macrobending loss) can be set to be equal to or less than 1.59 dB/m. Furthermore, the zero-dispersion wavelength of the optical fiber 10 can be set to be equal to or greater than 1300 nm and equal to or less than 1324 nm, and also the dispersion slope at the zero-dispersion wavelength can be set to be equal to or less than 0.092 ps/nm$^2$/km. As a result, the optical fiber 10 can satisfy the standard specified in, for example, ITU-T G.652 (hereinafter may be referred to as G.652 standard). Furthermore, setting MFD to be equal to or less than 9.2 μm enables the optical fiber 10 to satisfy G.657A standard, in particularly, G.657A2 standard. A value of 1.59 dB/m for the macrobending loss expresses a value of 0.1 dB/turn in G.657A2 standard with the unit converted. By combining values of the structural parameters as appropriate, for example, 2a of the optical fiber 10 may be set in such a manner that the effective cutoff wavelength is equal to or less than 1530 nm, to satisfy G.654 standard.

If b/a is equal to or less than 2.5 in the optical fiber 10, variations in macrobending loss due to variations in b/a can be reduced, which further increases the manufacturability.

Figure 3:
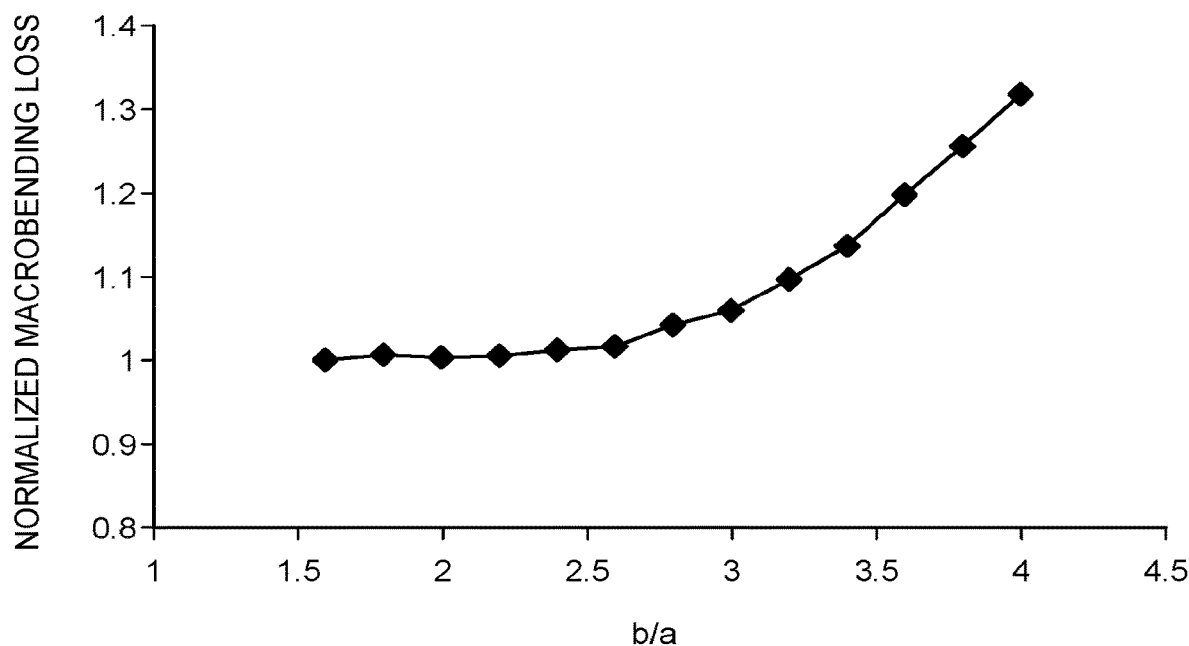
FIG. 3 is a diagram illustrating an example of the relationship between b/a and a normalized macrobending loss.

A specific description will be given below using simulation calculation results. FIG. 3 is a diagram illustrating an example of the relationship between b/a and standardized macrobending losses in the optical fiber 10. In FIG. 3, Δ1 is set to be 0.37%, the trench width (c−b) is set to be one half the core diameter, in other words, a value equal to a, 2a is adjusted in such a manner that the effective cutoff wavelength is about 1250 nm, and Δ2 is set to be 0% in the optical fiber 10. Also, b/a is changed from 1.6 to 4.0. A normalized macrobending loss is obtained by normalizing a value of a macrobending loss using a value when b/a is 1.6.

As illustrated in FIG. 3, when b/a is equal to or less than 2.5, variations in normalized macrobending loss due to variations in b/a are very small and stable, while, when b/a is greater than 2.5, the variations become great. Consequently, if b/a is equal to or less than 2.5, variations in macrobending loss due to variations in b/a resulting from an error in manufacturing, for example, can be reduced, which further increases the manufacturability. Particularly, when the trench width (c-b) is less than 8 μm, variations in macrobending loss due to variations in b/a are apt to be great, and thus b/a is more preferably set to be equal to or less than 2.5.

A specific description will subsequently be given of changes in optical characteristics of the optical fiber 10 when some of the structural parameters are changed, using simulation calculation results. First, relative to the structural parameters presented in calculation example No. 1 presented in Table 1A, Δ1 (0.37%), Δ3 (−0.20%), b/a (3), c/a (4), and 2a (8.4 μm), b/a was changed from 2.8 to 1.8 like calculation examples Nos. 2 to 7, and the changes in optical characteristics were calculated. In calculation example No. 1, a:b:c is 1:3:4. Note that Δ2 was set to be 0%, 2a was adjusted from 8.4 μm to 8.2 μm in such a manner that the effective cutoff wavelength was about 1250 nm.

Table 1B presents, of the optical characteristics of calculation examples Nos. 1 to 7, values for the zero-dispersion wavelength, dispersion slope, MFD, cutoff wavelength, and macrobending loss. Table 1B also presents standard values of G.657A2 standard as standards. As can be seen from Tables 1A and 1B, in calculation example No. 1, the macrobending loss is greater than 1.59 dB/m, but as b/a is decreased therefrom, the macrobending loss can be decreased, MFD and the zero-dispersion wavelength can also be decreased, and the dispersion slope can be increased. In this manner, the optical characteristics, such as the macrobending loss, can be adjusted by adjusting the value of b/a. The present inventors changed the relative structural parameters variously from the values of calculation example No. 1, and furthermore, relative to the changed values, changed b/a to perform simulation calculations, which has indicated that b/a is preferably equal to or greater than 1.8 in order to satisfy G.657A2 standard.

TABLE 1A

|  | Δ1 [%] | Δ3 [%] | b/a | c/a | 2a [μm] |
|---|---|---|---|---|---|
| No. 1 (reference) | 0.37 | −0.20 | 3 | 4 | 8.4 |
| No. 2 |  |  | 2.8 |  | 8.4 |
| No. 3 |  |  | 2.6 |  | 8.3 |
| No. 4 |  |  | 2.4 |  | 8.3 |
| No. 5 |  |  | 2.2 |  | 8.3 |
| No. 6 |  |  | 2.0 |  | 8.2 |
| No. 7 |  |  | 1.8 |  | 8.2 |

TABLE 1B

|  | Zero-dispersion wavelength [nm] | Dispersion slope [ps/nm$^2$/km] @zero-dispersion wavelength | MFD [μm] @1310 nm | Cutoff wavelength [nm] @22 m | Macro-bending loss [dB/m@20 mm] @1550 nm |
|---|---|---|---|---|---|
| Standard value | 1300-1324 | ≤0.092 | 8.6-9.2 | ≤1260 | ≤1.59 |
| No. 1 (reference) | 1311 | 0.088 | 8.91 | 1252 | 3.10 |
| No. 2 | 1310 | 0.089 | 8.91 | 1258 | 2.37 |
| No. 3 | 1311 | 0.089 | 8.86 | 1248 | 1.56 |
| No. 4 | 1309 | 0.090 | 8.84 | 1249 | 1.15 |
| No. 5 | 1306 | 0.091 | 8.82 | 1250 | 1.10 |
| No. 6 | 1304 | 0.092 | 8.73 | 1243 | 1.04 |
| No. 7 | 1299 | 0.093 | 8.66 | 1240 | 0.903 |

Next, relative to the structural parameters presented in calculation example No. 1 presented in Table 2A, c/a was changed from 4.2 to 5.2 like calculation examples Nos. 8 to 13, and the changes in optical characteristics were calculated. As with the case of Table 1A, Δ2 was set to be 0%, 2a was adjusted from 8.4 μm to 7.7 μm in such a manner that the effective cutoff wavelength was about 1250 nm.

Table 2B presents, of the optical characteristics of calculation examples Nos. 1 and 8 to 13, values for the zero-dispersion wavelength, dispersion slope, MFD, cutoff wavelength, and macrobending loss. As can be seen from Tables 2A and 2B, in calculation example No. 1, the macrobending loss is greater than 1.59 dB/m, but as c/a is increased therefrom, the macrobending loss can be decreased, MFD and the dispersion slope can also be decreased, and the zero-dispersion wavelength can be decreased. In this manner, the optical characteristics, such as the macrobending loss, can be adjusted by adjusting the value of c/a. The present inventors changed the relative structural parameters variously from the values of calculation example No. 1, and furthermore, relative to the changed values, changed c/a to perform simulation calculations, which has indicated that c/a is preferably equal to or greater than 3.4 and equal to or less than 5.0, and furthermore, 3.4 and equal to or less than 4.6 in order to satisfy G.657A2 standard.

TABLE 2A

|  | Δ1 [%] | Δ3 [%] | b/a | c/a | 2a [μm] |
|---|---|---|---|---|---|
| No. 1 (reference) | 0.37 | −0.20 | 4 | 4 | 8.4 |
| No. 8 |  |  |  | 4.2 | 8.3 |
| No. 9 |  |  |  | 4.4 | 8.2 |
| No. 10 |  |  |  | 4.6 | 8.1 |
| No. 11 |  |  |  | 4.8 | 8.0 |
| No. 12 |  |  |  | 5.0 | 7.9 |
| No. 13 |  |  |  | 5.2 | 7.7 |

TABLE 2B

|  | Zero-dispersion wavelength [nm] | Dispersion slope [ps/nm$^2$/km] @zero-dispersion wavelength | MFD [μm] @1310 nm | Cutoff wavelength [nm] @22 m | Macro-bending loss [dB/m@20 mm] @1550 nm |
|---|---|---|---|---|---|
| Standard value | 1300-1324 | ≤0.092 | 8.6-9.2 | ≤1260 | ≤1.59 |
| No. 1 (reference) | 1311 | 0.088 | 8.91 | 1252 | 3.10 |
| No. 8 | 1314 | 0.087 | 8.83 | 1248 | 2.01 |
| No. 9 | 1315 | 0.087 | 8.80 | 1245 | 1.91 |
| No. 10 | 1317 | 0.087 | 8.76 | 1247 | 1.28 |
| No. 11 | 1319 | 0.086 | 8.71 | 1249 | 0.943 |
| No. 12 | 1319 | 0.086 | 8.72 | 1253 | 0.853 |
| No. 13 | 1325 | 0.085 | 8.62 | 1243 | 0.769 |

Figure 4:
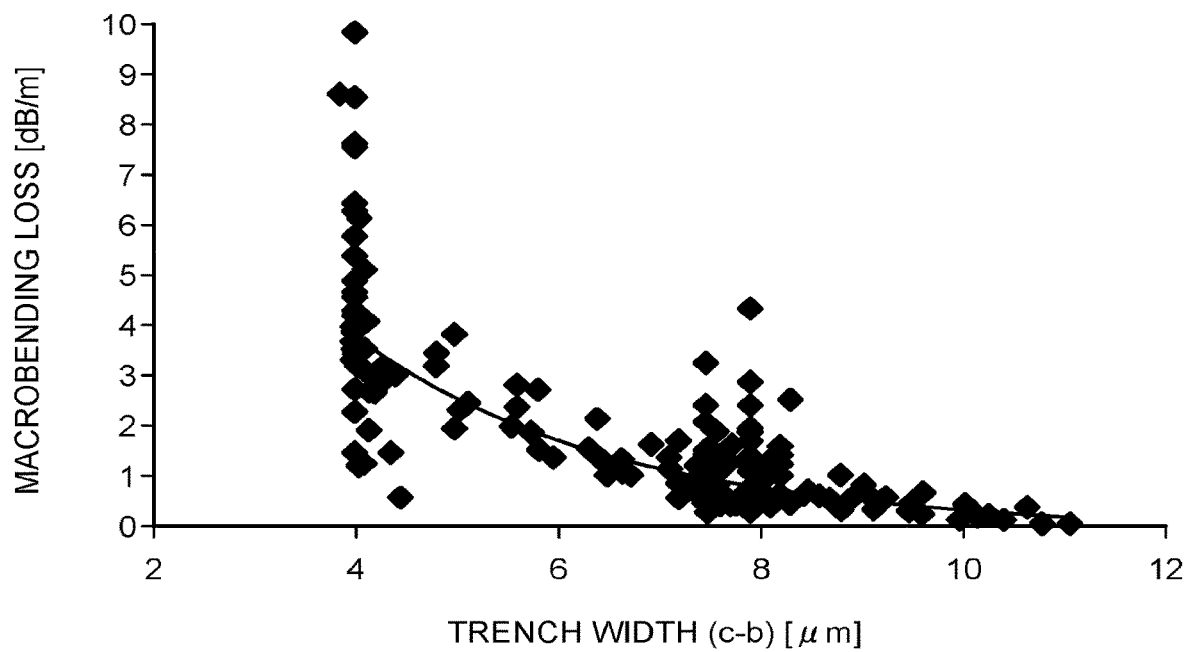
FIG. 4 is a diagram illustrating the relationship between a trench width (c-b) and a macrobending loss.

In order to reduce the macrobending loss with |Δ3| being equal to or less than 0.25%, the trench width (c−b) is preferably great. For example, FIG. 4 is a diagram illustrating the relationship between the trench width (c−b) and the macrobending loss. The rhombuses indicate data points, and the solid line indicates a curve obtained by approximating the data points by an exponential function. The data points indicate the results of variously setting and calculating the structural parameters, Δ1, Δ2, Δ3, a, b, and c, in such a manner that |Δ3| is equal to or less than 0.25%. Although variations exist among the structural parameters, in order to stably satisfy the macrobending loss of G.657A2 standard, for example, which is equal to or less than 1.59 dB/m, the trench width (c−b) is preferably equal to or greater than 7 μm. In view of the impact of manufacturing variations, the trench width (c−b) is preferably equal to or greater than 8 μm. However, as illustrated in FIG. 4, it is obvious that, even if the trench width (c−b) is smaller than 7 μm, the macrobending loss can be equal to or less than 1.59 dB/m depending on the selection of combinations of the structural parameters.

Next, relative to the structural parameters presented in calculation example No. 1 presented in Table 3A, Δ2 was changed from −0.10% to 0.10% like calculation examples Nos. 14 to 17, and the changes in optical characteristics were calculated. As with the case of Table 1A, 2a was adjusted from 8.4 μm to 6.5 μm in such a manner that the effective cutoff wavelength was about 1250 nm.

Table 3B presents, of the optical characteristics of calculation examples Nos. 1 and 14 to 17, values for the zero-dispersion wavelength, dispersion slope, MFD, cutoff wavelength, and macrobending loss. As can be seen from Tables 3A and 3B, in calculation example No. 1, the macrobending loss is greater than 1.59 dB/m, but as Δ2 is decreased therefrom, the macrobending loss can be decreased, MFD and the zero-dispersion wavelength can also be decreased, and the dispersion slope can be increased. Meanwhile, with Δ2 increased, the macrobending loss is increased, but MFD and the zero-dispersion wavelength can be increased. In this manner, the optical characteristics, such as the macrobending loss, can be adjusted by adjusting the value of Δ2. The present inventors changed the relative structural parameters variously from the values of calculation example No. 1, and furthermore, relative to the changed values, changed Δ2 to perform simulation calculations, which have indicated that Δ2 is preferably equal to or greater than −0.5% and equal to or less than 0.5% in order to satisfy G.657A2 standard.

TABLE 3A

|  | Δ1 [%] | Δ2 [%] | Δ3 [%] | b/a | c/a | 2a [μm] |
|---|---|---|---|---|---|---|
| No. 1 (reference) | 0.37 | 0 | −0.20 | 3 | 4 | 8.4 |
| No. 14 |  | −0.05 |  |  |  | 8.7 |
| No. 15 |  | −0.10 |  |  |  | 8.9 |
| No. 16 |  | 0.05 |  |  |  | 7.7 |
| No. 17 |  | 0.10 |  |  |  | 6.5 |

TABLE 3B

|  | Zero-dispersion wavelength [nm] | Dispersion slope [ps/nm²/km] @zero-dispersion wavelength | MFD [μm] @1310 nm | Cutoff wavelength [nm] @22 m | Macro-bending loss [dB/m@20 mm] @1550 nm |
|---|---|---|---|---|---|
| Standard value | 1300-1324 | ≤0.092 | 8.6-9.2 | ≤1260 | ≤1.59 |
| No. 1 (reference) | 1311 | 0.088 | 8.91 | 1252 | 3.10 |
| No. 14 | 1301 | 0.090 | 8.71 | 1246 | 1.52 |
| No. 15 | 1294 | 0.092 | 8.55 | 1256 | 0.629 |
| No. 16 | 1330 | 0.086 | 9.10 | 1255 | 8.62 |
| No. 17 | 1346 | 0.090 | 9.48 | 1248 | 35.3 |

Furthermore, Table 4A presents, as calculation examples Nos. 18 to 57, examples in which 2a is set in such a manner that Δ1 is equal to or greater than 0.34% and less than 0.40%, Δ2 is equal to or greater than −0.05% and equal to or less than 0.05%, |Δ3| is equal to or less than 0.25%, Δ1×|Δ3| is less than 0.08%², b/a is equal to or greater than 1.8, c/a is equal to or greater than 3.4 and equal to or less than 5.0, and the effective cutoff wavelength is equal to or less than 1260 nm. Table 4B presents, of the optical characteristics of calculation examples Nos. 18 to 57, values for the zero-dispersion wavelength, dispersion slope, MFD, cutoff wavelength, and macrobending loss. It has been determined that each optical characteristic satisfies G.657A2 standard in the range of the structural parameters presented in Table 4A.

TABLE 4A

|  | Δ1 [%] | Δ2 [%] | Δ3 [%] | Δ1 × |Δ3| [%²] | b/a | c/a | 2a |
|---|---|---|---|---|---|---|---|
| No. 18 | 0.35 | 0 | −0.20 | 0.0700 | 2.2 | 4.0 | 8.5 |
| No. 19 | 0.36 | 0 | −0.20 | 0.0720 | 2.2 | 4.0 | 8.3 |
| No. 20 | 0.36 | 0 | −0.20 | 0.0720 | 2.2 | 4.0 | 8.4 |
| No. 21 | 0.38 | 0 | −0.20 | 0.0760 | 2.2 | 4.0 | 8.2 |
| No. 22 | 0.39 | 0 | −0.20 | 0.0780 | 2.2 | 4.0 | 8.1 |
| No. 23 | 0.37 | −0.04 | −0.20 | 0.0740 | 2.2 | 4.0 | 8.5 |
| No. 24 | 0.37 | −0.02 | −0.20 | 0.0740 | 2.2 | 4.0 | 8.3 |
| No. 25 | 0.37 | −0.02 | −0.20 | 0.0740 | 2.2 | 4.0 | 8.4 |
| No. 26 | 0.37 | 0.02 | −0.20 | 0.0740 | 2.2 | 4.0 | 8.2 |
| No. 27 | 0.37 | 0.04 | −0.20 | 0.0740 | 2.2 | 4.0 | 7.9 |
| No. 28 | 0.37 | 0 | −0.16 | 0.0592 | 2.2 | 4.0 | 8.3 |
| No. 29 | 0.37 | 0 | −0.16 | 0.0592 | 2.2 | 4.0 | 8.4 |
| No. 30 | 0.37 | 0 | −0.18 | 0.0666 | 2.2 | 4.0 | 8.3 |
| No. 31 | 0.37 | 0 | −0.21 | 0.0777 | 2.2 | 4.0 | 8.2 |
| No. 32 | 0.37 | 0 | −0.20 | 0.0740 | 2.2 | 3.6 | 8.5 |
| No. 33 | 0.37 | 0 | −0.20 | 0.0740 | 2.2 | 3.8 | 8.3 |
| No. 34 | 0.37 | 0 | −0.20 | 0.0740 | 2.2 | 3.8 | 8.4 |
| No. 35 | 0.37 | 0 | −0.20 | 0.0740 | 2.2 | 4.2 | 8.2 |
| No. 36 | 0.37 | 0 | −0.20 | 0.0740 | 2.2 | 4.4 | 8.1 |
| No. 37 | 0.37 | 0 | −0.20 | 0.0740 | 2.2 | 4.6 | 7.9 |
| No. 38 | 0.34 | 0 | −0.20 | 0.0680 | 3.0 | 5.0 | 8.2 |
| No. 39 | 0.35 | 0 | −0.20 | 0.0700 | 3.0 | 5.0 | 8.1 |
| No. 40 | 0.36 | 0 | −0.20 | 0.0720 | 3.0 | 5.0 | 7.9 |
| No. 41 | 0.36 | 0 | −0.20 | 0.0720 | 3.0 | 5.0 | 8.0 |
| No. 42 | 0.38 | 0 | −0.20 | 0.0760 | 3.0 | 5.0 | 7.8 |
| No. 43 | 0.37 | −0.02 | −0.20 | 0.0740 | 3.0 | 5.0 | 8.0 |
| No. 44 | 0.37 | 0 | −0.12 | 0.0444 | 3.0 | 5.0 | 8.2 |
| No. 45 | 0.37 | 0 | −0.14 | 0.0518 | 3.0 | 5.0 | 8.1 |
| No. 46 | 0.37 | 0 | −0.16 | 0.0592 | 3.0 | 5.0 | 7.9 |
| No. 47 | 0.37 | 0 | −0.16 | 0.0592 | 3.0 | 5.0 | 8.1 |
| No. 48 | 0.37 | 0 | −0.18 | 0.0666 | 3.0 | 5.0 | 7.9 |
| No. 49 | 0.37 | 0 | −0.18 | 0.0666 | 3.0 | 5.0 | 8.0 |
| No. 50 | 0.37 | 0 | −0.21 | 0.0777 | 3.0 | 5.0 | 8.0 |
| No. 51 | 0.37 | 0 | −0.20 | 0.0740 | 2.2 | 5.0 | 7.9 |
| No. 52 | 0.37 | 0 | −0.20 | 0.0740 | 2.4 | 5.0 | 7.7 |
| No. 53 | 0.37 | 0 | −0.20 | 0.0740 | 2.6 | 5.0 | 7.7 |
| No. 54 | 0.37 | 0 | −0.20 | 0.0740 | 2.8 | 5.0 | 7.8 |
| No. 55 | 0.37 | 0 | −0.20 | 0.0740 | 3.2 | 5.0 | 7.9 |
| No. 56 | 0.37 | 0 | −0.20 | 0.0740 | 3.2 | 5.0 | 8.0 |
| No. 57 | 0.37 | 0 | −0.20 | 0.0740 | 3.4 | 5.0 | 8.1 |

TABLE 4B

|  | Zero-dispersion wavelength [nm] | Dispersion slope [ps/nm²/km] @zero-dispersion wavelength | MFD [μm] @1310 nm | Cutoff wavelength [nm] @22 m | Macro-bending loss [dB/m@20 mm] @1550 nm |
|---|---|---|---|---|---|
| Standard value | 1300-1324 | ≤0.092 | 8.6-9.2 | ≤1260 | ≤1.59 |
| No. 18 | 1305 | 0.091 | 9.05 | 1255 | 1.46 |
| No. 19 | 1307 | 0.091 | 8.89 | 1242 | 1.49 |
| No. 20 | 1306 | 0.091 | 8.94 | 1255 | 1.12 |
| No. 21 | 1307 | 0.090 | 8.71 | 1255 | 0.821 |
| No. 22 | 1308 | 0.090 | 8.60 | 1255 | 0.806 |
| No. 23 | 1302 | 0.091 | 8.66 | 1251 | 0.686 |
| No. 24 | 1305 | 0.090 | 8.69 | 1238 | 0.943 |
| No. 25 | 1304 | 0.091 | 8.73 | 1253 | 0.776 |
| No. 26 | 1309 | 0.091 | 8.92 | 1255 | 1.24 |
| No. 27 | 1313 | 0.091 | 8.95 | 1246 | 1.40 |
| No. 28 | 1307 | 0.090 | 8.83 | 1241 | 1.57 |
| No. 29 | 1306 | 0.091 | 8.87 | 1256 | 1.45 |
| No. 30 | 1307 | 0.090 | 8.82 | 1248 | 1.13 |
| No. 31 | 1307 | 0.090 | 8.80 | 1251 | 0.912 |
| No. 32 | 1305 | 0.091 | 8.87 | 1256 | 1.43 |
| No. 33 | 1308 | 0.090 | 8.78 | 1241 | 1.36 |
| No. 34 | 1307 | 0.090 | 8.82 | 1257 | 1.08 |
| No. 35 | 1309 | 0.090 | 8.74 | 1256 | 0.743 |
| No. 36 | 1310 | 0.090 | 8.71 | 1246 | 0.641 |
| No. 37 | 1312 | 0.090 | 8.62 | 1250 | 0.505 |
| No. 38 | 1316 | 0.087 | 9.09 | 1259 | 1.29 |
| No. 39 | 1317 | 0.087 | 8.96 | 1249 | 1.18 |
| No. 40 | 1320 | 0.086 | 8.80 | 1235 | 1.10 |
| No. 41 | 1318 | 0.087 | 8.84 | 1251 | 0.916 |
| No. 42 | 1320 | 0.086 | 8.61 | 1254 | 0.653 |
| No. 43 | 1315 | 0.087 | 8.61 | 1251 | 0.521 |
| No. 44 | 1314 | 0.087 | 8.84 | 1250 | 1.49 |
| No. 45 | 1316 | 0.087 | 8.80 | 1246 | 1.37 |
| No. 46 | 1319 | 0.086 | 8.73 | 1228 | 1.45 |
| No. 47 | 1315 | 0.087 | 8.80 | 1259 | 1.16 |
| No. 48 | 1319 | 0.086 | 8.72 | 1240 | 1.29 |

TABLE 4B-continued

|  | Zero-dispersion wavelength [nm] | Dispersion slope [ps/nm²/km] @zero-dispersion wavelength | MFD [μm] @1310 nm | Cutoff wave-length [nm] @22 m | Macro-bending loss [dB/m@20 mm] @1550 nm |
|---|---|---|---|---|---|
| No. 49 | 1317 | 0.087 | 8.76 | 1256 | 1.07 |
| No. 50 | 1320 | 0.086 | 8.72 | 1250 | 0.885 |
| No. 51 | 1320 | 0.086 | 8.73 | 1240 | 1.20 |
| No. 52 | 1317 | 0.088 | 8.61 | 1254 | 0.491 |
| No. 53 | 1320 | 0.087 | 8.63 | 1245 | 0.606 |
| No. 54 | 1320 | 0.086 | 8.68 | 1249 | 0.675 |
| No. 55 | 1320 | 0.085 | 8.73 | 1228 | 1.57 |
| No. 56 | 1318 | 0.086 | 8.76 | 1256 | 0.91 |
| No. 57 | 1316 | 0.086 | 8.80 | 1259 | 1.08 |

The optical fiber 10 according to the present embodiment can be manufactured by a publicly known manufacturing method including the step of manufacturing an optical fiber preform and the step of manufacturing an optical fiber by heating and melting, and drawing the optical fiber preform. In this case, the optical fiber preform includes portions serving as the central core portion 11, the intermediate layer 12, the trench layer 13, and the cladding portion 14 of the optical fiber 10. The optical fiber preform can be manufactured using vapor-phase axial deposition (VAD), modified chemical vapor deposition (MCVD), plasma chemical vapor deposition (PCVD), sol-gel, and other methods. The optical fiber preform can be manufactured by using, for example, the VAD method to form portions that constitute the central core portion 11, the intermediate layer 12, the trench layer 13, and a part of the cladding portion 14 of the optical fiber 10, and by using, for example, the outside vapor deposition (OVD) method to form, thereon, a glass layer that constitutes the remaining portion of the cladding portion 14.

The embodiment mentioned above does not limit the present disclosure. The present disclosure also includes any disclosure that is constituted by combining the components described above, as appropriate. A person skilled in the art can easily derive further effects and modifications. Therefore, a wider range of aspects of the present disclosure is not limited by the embodiment mentioned above, and various changes can be made.

INDUSTRIAL APPLICABILITY

The optical fiber according to the present disclosure can preferably be used in the field of optical communications, such as datacom and telecom.

The present disclosure exhibits the effect of being able to achieve the optical fiber having low bending loss characteristics as well as high manufacturability.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An optical fiber comprising:
a central core portion;
an intermediate layer formed around an outer circumference of the central core portion;
a trench layer formed around an outer circumference of the intermediate layer; and
a cladding portion formed around an outer circumference of the trench layer, wherein:
when, relative to the cladding portion, a relative refractive-index difference of the central core portion is $\Delta 1$, a relative refractive-index difference of the intermediate layer is $\Delta 2$, and a relative refractive-index difference of the trench layer is $\Delta 3$, relationships $\Delta 1 > \Delta 2 > \Delta 3$ and $0 > \Delta 3$ are satisfied and $\Delta 1$ is equal to or greater than 0.34% and equal to or less than 0.40%, $|\Delta 3|$ is equal to or less than 0.25%, and $\Delta 1 \times |\Delta 3|$ is less than 0.08%
when a core diameter of the central core portion is 2a, an inner diameter of the trench layer is 2b, and an outer diameter of the trench layer is 2c, b/a is equal to or greater than 1.8, and c/a is equal to or greater than 3.4 and equal to or less than 5.0, and
when an inner diameter of the trench layer is 2b and an outer diameter of the trench layer is 2c, a width (c−b) of the trench layer is greater than 7 μm.

2. The optical fiber according to claim 1, wherein $|\Delta 3|$ is equal to or greater than 0.10% and less than 0.25%.

3. The optical fiber according to claim 1, wherein $|\Delta 3|$ is equal to or greater than 0.10% and equal to or less than 0.20%.

4. The optical fiber according to claim 1, wherein $|\Delta 3|$ is equal to or greater than 0.10% and equal to or less than 0.18%.

5. The optical fiber according to claim 1, wherein, when a core diameter of the central core portion is 2a and an inner diameter of the trench layer is 2b, b/a is equal to or less than 2.5.

6. The optical fiber according to claim 1, wherein, when a core diameter of the central core portion is 2a, an inner diameter of the trench layer is 2b, and an outer diameter of the trench layer is 2c, b/a is equal to or greater than 1.8, and c/a is equal to or greater than 3.4 and equal to or less than 4.6.

7. The optical fiber according to claim 1, wherein $\Delta 2$ is equal to or greater than −0.05% and equal to or less than 0.05%.

8. The optical fiber according to claim 1 to 7, wherein a core diameter of the central core portion is set in such a manner that an effective cutoff wavelength is equal to or less than 1260 nm.

9. The optical fiber according to claim 1, wherein a mode field diameter at a wavelength of 1310 nm is equal to or greater than 8.6 μm and equal to or less than 9.5 μm.

10. The optical fiber according to claim 1, wherein a bending loss at a wavelength of 1550 nm in a case in which the optical fiber is bent at a diameter of 20 mm is equal to or less than 1.59 dB/m.

11. The optical fiber according to claim 1, wherein
a zero-dispersion wavelength is equal to or greater than 1300 nm and equal to or less than 1324 nm, and
a dispersion slope at the zero-dispersion wavelength is equal to or less than 0.092 ps/nm²/km.

* * * * *